United States Patent [19]

Gardner, Jr. et al.

[11] 3,737,076
[45] June 5, 1973

[54] ATMOSPHERIC CLOSED HOT WATER TANK SYSTEM WITH SEPARATE EXPANSION CONTROL

[75] Inventors: John A. Gardner, Jr., Tewksbury; Merle S. Brown, Cohasset; William H. Jacobs, Brookline, all of Mass.

[73] Assignee: Jet Spray Cooler, Inc., Waltham, Mass.

[22] Filed: Sept. 13, 1971

[21] Appl. No.: 180,031

[52] U.S. Cl............................222/146 H, 222/129.4
[51] Int. Cl. ...............................................B67d 5/62
[58] Field of Search.....................222/146 R, 146 H, 222/146 HS, 146 HE, 129.1–129.4

[56] References Cited

UNITED STATES PATENTS

| | | | |
|---|---|---|---|
| 2,799,300 | 7/1957 | Hellier | 222/129.4 X |
| 2,843,293 | 7/1958 | Burgoyne | 222/129.4 |
| 3,007,609 | 11/1961 | Pascucci | 222/129.2 |
| 3,586,214 | 6/1971 | Diebel | 222/129.4 |

Primary Examiner—Samuel F. Coleman
Attorney—Wolf, Greenfield & Sacks

[57] ABSTRACT

This invention relates to dispensers which require a source of hot water and more particularly comprises a hot beverage dispenser having a new and improved hot water heating system.

Most commercial hot water sources do not provide water at a high enough temperature so that it may be mixed with other ingredients in a food dispenser and be served directly without supplemental heating. Consequently some form of hot water heater is used in combination with a holding tank in most hot water systems. The systems take a number of different forms; for example, they may employ a closed or open tank, and those systems which use a closed tank may either be pressurized or unpressurized. All of the various sytems used heretofor have certain disadvantages which are described below.

10 Claims, 2 Drawing Figures

PATENTED JUN 5 1973　　　　　　　　　　　　3,737,076

ATMOSPHERIC CLOSED HOT WATER TANK SYSTEM WITH SEPARATE EXPANSION CONTROL

BACKGROUND — PRIOR ART

Most hot water storage tanks used in hot beverage dispensers deliver water on demand at 175°–185°F. Resistance water heaters are either directly immersed in the water or are placed in heat exchange relationship with the tank walls to elevate the water temperature. Normally an adjustable thermostat is used to preset and control the water temperature automatically at a desired temperature level. The hot water systems also include a solenoid valve to control the discharge of water from the tank, and a flow regulating valve is used to maintain a fixed flow rate during a preset drink dispensing cycle.

One system commonly used employs a closed, pressurized tank. Because the tank is pressurized, substantial cost is involved in tank construction to accommodate the tank pressures, and provisions must be made for relieving excessive pressures. Difficulties with this system are encountered typically upon thermostat failure. When failure occurs in the operating condition during a period when the dispenser is not being used, (typically overnight), the water temperature and resultant pressure rises until some form of safety device provided in the tank relieves the pressure. Since the tanks in such systems are directly connected to the incoming water line, the pressure build up associated with such thermostat failure has a tendency to back up in the system. Consequently, when a drink is drawn under such conditions the water will jet violently from the outlet and may result in injury to the operator.

Pressurized systems generally are less complex than systems which operate at atmospheric pressure. For example, ordinarily no external arrangement is required to compensate for expansion of incoming cold water. Compensation is rather achieved through the compression of the air in the head space in the tank above the tank water outlet. A concomitant disadvantage of this feature, however, is that the air chamber collects gases which evolve from water during heating, such as chlorine, sulfur dioxide, etc., and the concentration of such gases in the tank imparts an "off-taste" to the water which is subsequently dispensed, and the hot drink of course is adversely effected.

Another commonly used system employs an open tank operating at atmospheric pressures. This type of system requires the use of some float or other signalling device in combination with a solenoid valve to maintain the water level and compensate for water expansion. A second solenoid is required in such systems to control water discharge during the drink dispense cycle.

Open atmospheric tanks require that the tank be elevated with respect to the location of the mixing chamber in the dispenser where water and the flavor concentrate are combined, to achieve maximum hydrostatic head to speed the discharge flow rates from the tank. This necessarily limits the design of the dispenser. And in such systems relatively large ducts of minimum length and free of bends and restrictions are used to maximize flow rates. Further, the discharge line must leave the tank at the bottom and be free of dips and rises that form traps in the line where the water may cool.

Yet a third commonly used system includes a closed tank operated at atmospheric pressure. This system requires automatic compensation for water expansion upon heating. The solenoid and flow regulators are located in the inlet line to the tank and isolate the line pressure from the tank. Such a system may be classified as a displacement fill system because water discharges from the top of the tank upon the introduction of water into the tank at the bottom.

While closed atmospheric pressure tanks are widely used, they have many disadvantages. Without provision of some form of expansion control, expansion water continually drips from the tank as cold water expands upon heating. The expansion control ordinarily provided includes an aspirator in the form of a jet pump and an expansion reservoir. The expansion reservoir is connected to the low pressure region of the aspirator in the discharge line of the tank, and when water is drawn from the tank through the aspirator, the aspirator action draws water from the expansion reservoir, which mixes with the discharging water from the tank. In order to avoid temperature dilution (water from the reservoir reducing the temperature of the water discharged from the tank) the expansion reservoir must be placed in heat exchange relationship with the tank itself, or some auxiliary heating system must be provided to independently heat the reservoir. An additional disadvantage of this form of system is the tendency of water in the expansion reservoir to become stagnant. Also, the vent normally provided in the expansion reservoir which also vents the tank tends to become waterbound in the zone of the aspirator and consequently water tends to hang back in the tank discharge line at the end of each drink dispense cycle, and this water subsequently drips at random from the discharge line. As yet another disadvantage of such systems, percolation tends to occur at the aspirator during heating cycles because of the relatively small capacity of the aspirator and this also causes water to drip from the discharge tube. To avoid this problem operators frequently reduce operating temperatures to approximately 175°F., which is at the very lower end of the acceptable temperature range. And scaling is another phenomena which is particularly troublesome at the aspirator, and causes clogging and erratic operation. And all of the prior art systems described are susceptible to tank burn out as a result of thermostat failure.

OBJECTS AND FEATURES

One important object of this invention is to provide a beverage dispenser with a hot water system which eliminates many of the disadvantages of pressurized and atmospheric tanks as described above in connection with the prior art.

A more specific object of this invention is to provide a hot water system for beverage dispensers having a closed atmospheric pressure tank that employs an expansion reservoir which does not dilute the temperature of the water discharged from the tank.

Another specific object of this invention is to provide a hot water system for beverage dispensers employing an atmospheric closed tank, which provides greater freedom of choice of water temperature.

Yet another important object of this invention is to provide a hot water system for beverage dispensers, which minimizes vapor losses.

To accomplish these and other objects, the hot beverage dispenser of this invention includes a hot water system having a closed hot water tank that operates at atmospheric pressures, with an inlet or fill line connected to the bottom. An aspirator is disposed in the inlet line, and an expansion reservoir is disposed at an elevation so that its vertical extent spans the top of the tank. A duct connects the expansion reservoir to the low pressure region of the aspirator, and a discharge line extends from the top of the tank for drawing water from the tank to the mixing chamber in the dispenser where the hot water is mixed with the flavor concentrate.

These and other objects and features of the invention will be better understood and appreciated from the following detailed description of one embodiment thereof, selected for purposes of illustration and shown in the accompanying drawing in which:

BRIEF FIGURE DESCRIPTION

FIG. 1 is a perspective view of a beverage dispenser constructed in accordance with this invention; and FIG. 2 is a diagrammatic side view of the beverage dispenser shown in FIG. 1 illustrating the hot water system.

DETAILED DESCRIPTION OF PREFERRED EMBODIMENT

Figures 1, 2:
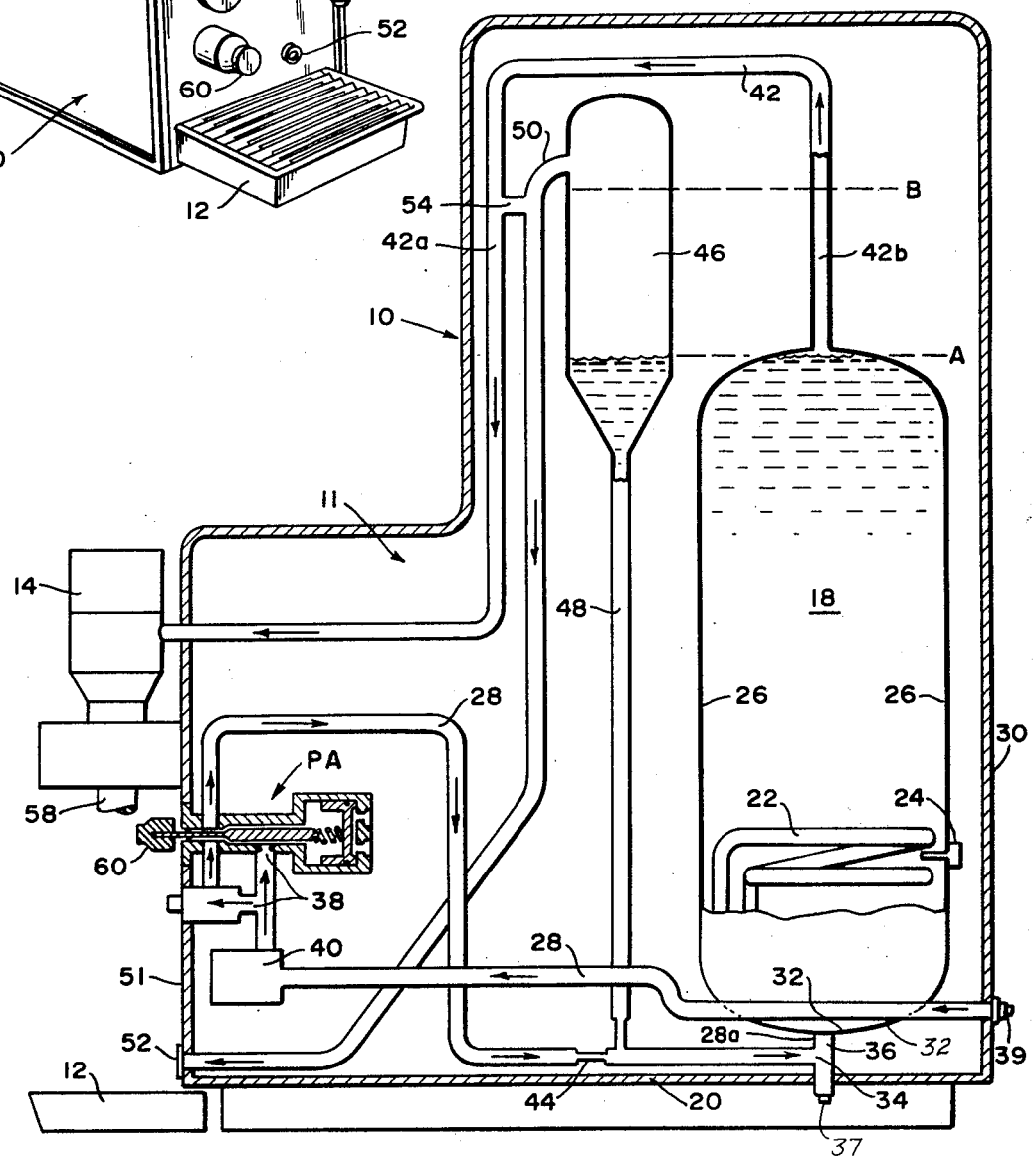

The beverage dispenser shown in the drawing is of the class of beverage dispensers shown in U.S. Pat. No. 3,568,887 dated Mar. 9, 1971 and copending applications Ser. Nos. 887,671 and 36,863 filed Dec. 23, 1969 and May 13, 1970 respectively, all assigned to Jet Spray Cooler, Inc., Waltham, Massachusetts. The hot water system of the present invention is an improvement over the hot water systems shown in the patent and earlier patent applications. The hot water system is suitable for use with beverage systems employing either syrup or powder as the flavor source. The system is also suitable for use in othr forms of food dispensers such as soup dispensers or where plain hot water is required.

The beverage dispenser of FIG. 1 includes a housing 10 that contains a syrup delivery circuit (not shown) as well as the water delivery system 11 shown in detail in FIG. 2, and an electrical control circuit (not shown). The housing 10 has a drip tray 12 attached to the bottom of its front wall and a mixing chamber 14 on the front wall above the tray 12. A typical assembly 14 is shown and described in detail in U.S. Pat. No. 3,568,887, supra.

In FIG. 2 the hot water system 11 which supplies water at the desired temperature to the mixing chamber 14 is shown in detail. The system includes hot water tank 18 supported on the bottom wall 20 by any appropriate support and contains an immersion heater 22 for heating the water in the tank to the desired temperature. While in the embodiment shown the heater is an immersion heater which lies within the tank, it is to be understood that the heater may be mounted in or about the tank wall in heat exchange relationship with it. The particular configuration and disposition of the heater is not critical to the present invention. As shown in FIG. 2, a thermostat 24 is mounted on the tank wall 26, which will ordinarily be disposed in the heater circuit (not shown) so as to control operation of the heater 22 and thereby govern water temperature.

An inlet duct 28 extends from the rear wall 30 of the housing 10 to the bottom 32 of the tank through a solenoid valve 40, flow regulating device 38, proportioning assembly PA, T-connection 34 and drain tube 36. The drain tube extends through the bottom wall 20 of the housing 10 and as its name suggests, affords means for emptying the hot water tank 18 for any reason. Ordinarily, a stopper 37 is threaded into the drain tube 36 so that the tube is inactive except as forming part of the inlet duct 28 for filling the tank. A fitting 39 is conected to the end of the inlet duct 28 outside a rear wall 30 of the housing to afford means for coupling a water pipe or hose to the dispenser.

The flow regulating device 38 and solenoid valve 40 interrupt the inlet duct 28 inside the dispenser housing 10 and together constitute a conventional displacement type fill system for the hot water tank 18. That is, when the solenoid valve is open, water enters the tank 18, and an equal volume of water is displaced out the tank discharge pipe 42 in a manner which is explained in greater detail below. The flow regulating valve 38 may typically be of the variable orifice type which varies with pressure so that a constant flow rate is maintained whenever the valve is open.

The proportioning assembly PA interrupts the inlet duct 28 and functions as a metering system to control the ratio of flavoring medium and water. The proportioning assembly PA forms the subject matter of U.S. application Ser. No. 887,671, supra, and the details of the assembly form no part of this invention and consequently are not described. Rather the assembly has been shown only schematically. Further, while the proportioning assembly suggested in FIG. 2 is designed for use with flavor syrup, the invention of the present application is not limited to beverage dispensers which use syrup. As pointed out above, the invention has equal utility in dispensers which employ powder as the flavor medium.

An aspirator in the form of a jet pump or other means 44 is provided in the inlet duct 28 downstream of the solenoid 40 and proportioning assembly PA, and an expansion reservoir 46 through its standpipe 48 is connected to the low pressure region of the aspirator 44. In FIG. 2 the expansion reservoir 46, standpipe 48, portion 28a of inlet duct 28 and tank 18 are shown to describe a U-tube configuration. The vent pipe 50 connected to the top of the expansion reservoir establishes a head of atmospheric pressure above the liquid in the reservoir. Because the standpipe 48 is connected to the low pressure region of the aspirator 44, flow into the tank 18 through the inlet or fill duct 28 will draw water from the reservoir 46 into tank 18.

The vent pipe 50 is connected to the front wall 51 of the housing 10 so as to provide an outlet 52 immediately above the drip tray 12. The discharge pipe 42 which is the outlet from the hot water tank 18 is connected directly to the mixing chamber 14 through the front wall 51 of the housing. A passage 54 joins the vent pipe 50 with the discharge pipe 42. In order for an operator to draw a hot drink from the dispenser, the actuator button 56 is depressed which places in operation the control circuit (not shown) within the housing 10. The dispense cycle includes a period during which the solenoid valve 40 in the fill pipe 28 in the hot water system is open, which causes water to be displaced from the tank 18 out the discharge pipe 42 and flow to the mixing chamber 14. At the mixing chamber the hot water is mixed with either syrup or powder, whichever is used in the particular dispenser, and the mixed water and flavor medium is discharged through the spout 58. In the embodiment shown, a selector dial 60 is suggested which allows for the selection of a large or small drink. Such an arrangement is shown in detail in U.S. Pat. No. 3,563,887, supra.

The expansion reservoir 46 in the system is not in physical contact with the heating tank 18. It is elevated to a level which is coincident with the normal operating water levels within the tank 18 and its vertical outlet 42b which forms part of discharge pipe 42. Under static conditions with the hot water tank 18 full and the solenoid valve 40 closed, the water in the hot water tank will backflow by gravity out the drain portion 28a of the inlet duct and up the standpipe 48 and into reservoir 46 until an equilibrium is reached.

Because water is fed to the mixing chamber 14 by literally displacing it from tank 18, it is essential that the tank 18 be maintained full and a balance must be maintained with the volume of water collected in the vertical portion of the standpipe 48 and expansion chamber 46. It also will be appreciated that because the solenoid valve 40 is controlled by a timed cycle, the amount of water entrained from the expansion chamber 46 and standpipe 48 during a given period must be maintained constant for it supplements the water drawn through the inlet duct 28 in filling the tank 18. If the volume of water entrained from the expansion chamber and standpipe varies, then the amount of water fed into the tank 18 during any given period will not be constant, and consequently the size of drinks dispensed by the dispenser will vary. And the volume of water in the expansion reservoir and standpipe must always be larger than can be aspirated during the longest possible drink dispense cycle to avoid completely draining the reservoir and standpipe.

Typically, the aspiration rate may be approximately 1 cc/second when the flow rate through the aspirator is 39 cc/second. With a total volume of approximately 15 cc in the reservoir and standpipe, the maximum length of drink dispense time would be 15 seconds, after which air would be drawn into the tank with the water from the main supply. The air discharging from the tank 18 through outlet pipe 42 would create turbulence in the line and cause some flow of water into the vent 50 through the bypass 54.

The significance of this balance between the tank 18 and reservoir-standpipe combination is greatest when the dispenser is being operated in so-called "fast service" installations where the use rate approximates the mechanical speed of the dispenser. If the water tank 18 is filled cold and then heated, the water will expand upwardly in the tank causing the level to rise in the expansion leg composed of the reservoir 46 and pipe 48, until maximum temperature is achieved. This level may be represented as an expansion from A to B in FIG. 2, and the ratio of the volume per increment of height between the tank discharge pipe 42 and the reservoir 46 is such that the bulk of the expansion water is collected in the reservoir before reaching the level of the top of down run 42a in pipe 42. If malfunctioning occurs, the excess water will exit from the expansion reservoir 46 through pipe 50 and its outlet 52 to the drip tray 12 so as to avoid an objectionable drip from the spout 58 of mixing chamber 14. Thus spillover is avoided.

Under fast draw conditions, (perhaps four drinks per minute) the action of the aspirator will draw some water out of the expansion reservoir 46 during each drink cycle. If the drink cycle is 5 seconds and the aspiration rate is 1cc/second, 5cc will be removed from the expansion reservoir with each drink. This is substantially offset by the expansion of the incoming cold water in the tank. If the drink consumes 6 ⅔ ounces of water, then that amount of cold water introduced into the tank and heated from 32° to 212° F. will result in an expansion of approximately 4cc. While it would appear that the reservoir-standpipe combination would eventually drain because of the difference between outflow and expansion under sustained draw conditions, this does not actually occur because the head in the reservoir and standpipe decreases, which reduces the aspiration rate. This reduction in aspiration rate is sufficient to prevent the siphon leg comprising the reservoir and standpipe from being drained.

Another advantage of the present invention is that it avoids dilution of drink temperature. By feeding the water from the expansion reservoir and standpipe into the cold inlet line to the tank, expansion water has no effect upon the temperature of the water in the discharge pipe 42.

It will also be appreciated that in this particular hot water system, the diameter of the discharge pipe 42 is not critical to the performance of the dispenser, and the line typically may be of one-half inch diameter. This minimizes resistance to discharge flow and reduces the possibility of a block in the line caused by scale build-up. Further, there is no aspirator in the discharge line to promote nucleate boiling which may cause water to spurt from the outlet.

Another advantage of the present system is the minimum effect of vapor losses upon drink size. In prior art devices with the aspirator located in the discharge pipe, when the level of water in the discharge pipe falls below the aspirator no transfer of water from the expansion reservoir to the tank occurs, and with evaporation the level of water in the discharge pipe continues to drop. As a result, the first drink discharged from the dispenser after a prolonged shutdown (over a weekend) is short due to the vapor losses. On the contrary, in the present system the U-tube arrangement maintains the expansion reservoir in constant effective communication with the tank and its discharge pipe so that changes in drink size are not discernable.

And yet another advantage of the hot water system of this invention is that when the tank is drained, the expansion reservoir also drains. Consequently, during shipment or periods of storage when it is desirable to drain the water system completely to avoid the possibility of stagnation or prevent damage from freezing, merely by opening the drain pipe 36 completely drainage is effected.

Still another advantage of the present system is that it provides complete drain-down of water in the discharge line to the mixing chamber 14 during each dispense cycle. During the normal cycle, the inlet water pressure entering through inlet duct 28 forces water out the top of the tank and keeps the discharge tube 42 full until the solenoid 40 closes at the end of the cycle. At that instant, the water in the vertical leg 42b of the discharge line 42 above the tank drains back into the tank 18, while the water in the down run 42a of discharge line 42 runs out to the mixing chamber 14 and into the drink. In the prior art systems, the water may not drain back into the tank, but rather drains into the expansion reservoir. This often causes a blockage of the vent in the expansion reservoir so that it is no longer in communication with the tank. Consequently, water in the down run 42a cannot discharge freely into the mixing chamber but rather slowly drips from it as air is gradually vented through the water column. It will also be appreciated that the bypass 54 provides a safety drain for the system in the event a blockage occurs in the mixing chamber 14.

From the foregoing description it is evident that the present invention has many advantages over the prior art. The combination of improvements offer substantially better performance than may be derived from the prior art systems.

What is claimed is:

1. A hot water system for beverage dispensers comprising
    a hot water tank and a heater disposed in heat exchange relationship with the tank to heat water introduced into the tank,
    a water inlet line connected to the bottom of the tank and means including a valve in the line for regulating the flow of water to the tank,
    an aspirator in the line between the valve and tank,
    an expansion reservoir disposed at an elevation so that its vertical extent spans the top of the tank,
    a duct connected at one end to the low pressure region of the aspirator and at the other end to the expansion reservoir,
    an expansion and overflow port formed in the expansion reservoir adjacent the top,
    and a discharge line connected to the top of the tank to direct heated water from the tank.

2. A hot beverage dispenser comprising
    a housing,
    a hot water system mounted in said housing
    a mixing unit mounted on the housing for combining hot water and a flavor concentrate,
    said hot water system including
    a hot water tank and a heater disposed in heat exchange relationship with the tank to heat water introduced into the tank,
    a water inlet line connected to the bottom of the tank and means including a valve in the line for regulating the flow of water to the tank,
    an aspirator in the line between the valve and tank,
    an expansion reservoir disposed at an elevation so that its height spans the top of the tank,
    a duct connected at one end to the low perssure region of the aspirator and at the other end to the expansion reservoir,
    an expansion and overflow port formed in the expansion reservoir adjacent the top,
    and a discharge line connected to the top of the tank to direct water from the tank to the mixing unit.

3. A hot beverage dispenser as described in claim 2 further characterized by
    said expansion and overflow port in the reservoir being connected to the atmosphere,
    and a passage connecting the overflow port and the discharge line.

4. A hot water system for beverage dispensers comprising
    a tank and a heater associated therewith for raising the temperature of the water in the tank,
    a water inlet line connected to the tank,
    means provided in the inlet line creating a low pressure region therein when water flows through the line into the tank,
    an expansion reservoir disposed at an elevation so that its height spans the normal level of water in the tank both when the water is cold and heated,
    a duct connecting the reservoir and the low pressure region in the line,
    and a discharge line connected to the tank.

5. A hot water system as described in claim 4 further characterized by
    said inlet line being connected to the bottom of the tank and the outlet line to the top of the tank.

6. A hot water system as described in claim 4 further characterized by
    a valve in the inlet line controlling the discharge of water from the tank through the outlet line.

7. A hot water system as described in claim 6 further characterized by
    said valve being upstream of the low pressure region on the inlet line.

8. A hot water system as described in claim 4 further characterized by
    said reservoir and tank being physically separated so as to be free of heat exchange relationship with one another.

9. A hot water system as described in claim 7 further characterized by
    said discharge line being free of restrictions adjacent the top of the tank and being approximately one-half inch diameter line.

10. A hot water system as described in claim 7 further characterized by
    an overflow and expansion port provided adjacent the top of the reservoir,
    a hose connected to said port to carry the overflow of the reservoir to a remote point,
    and a line connecting the hose and the discharge lines.

* * * * *